United States Patent [19]
Seidel et al.

[11] Patent Number: 5,335,567
[45] Date of Patent: Aug. 9, 1994

[54] PROCESS FOR CONTROLLING THE ACTUATING PRESSURE IN A CONTROL ELEMENT OF AN ELECTROHYDRAULICALLY CONTROLLED MOTOR VEHICLE TRANSMISSION

[75] Inventors: Willi Seidel, Eberdingen-Hochdorf; Joseph Petersmann, Wimsheim, both of Fed. Rep. of Germany

[73] Assignee: Dr. Ing. h.c.F Porsche AG, Fed. Rep. of Germany

[21] Appl. No.: 919,403

[22] Filed: Jul. 27, 1992

[30] Foreign Application Priority Data

Jul. 25, 1991 [DE] Fed. Rep. of Germany ....... 4124603

[51] Int. Cl.$^5$ .................. F16H 61/08; B60K 41/18
[52] U.S. Cl. .................. 475/120; 475/123; 477/154; 477/155
[58] Field of Search .................. 74/866, 867

[56] References Cited

U.S. PATENT DOCUMENTS

| | | | |
|---|---|---|---|
| 4,707,789 | 11/1987 | Downs et al. | 74/866 X |
| 4,742,461 | 5/1988 | Eschrich et al. | 74/866 X |
| 4,781,080 | 11/1988 | Iwatsuki | 74/867 |
| 4,953,090 | 8/1990 | Narita | 74/867 X |
| 4,989,477 | 2/1991 | Hunter et al. | 74/867 X |
| 5,014,575 | 5/1991 | Fujiwara et al. | 74/866 |
| 5,029,087 | 7/1991 | Cowan et al. | 74/866 X |
| 5,070,747 | 12/1991 | Lentz et al. | 74/867 X |
| 5,079,970 | 1/1992 | Butts et al. | 74/867 X |
| 5,188,005 | 2/1993 | Sankpal et al. | 74/867 X |

FOREIGN PATENT DOCUMENTS 231593 8/1987 European Pat. Off. .
435377 7/1991 European Pat. Off. .

OTHER PUBLICATIONS

Bosch Techn. Berichte (1983) pp. 160–166.
AT2–Automobiltechnische Zeitschrift 85 (1983) pp. 401–405.

Primary Examiner—Leslie A. Braun
Assistant Examiner—Khoi Ta
Attorney, Agent, or Firm—Evenson, McKeown, Edwards & Lenahan

[57] ABSTRACT

A process is described for controlling the actuating pressure in a control element (shift element) of an electrohydraulically controlled transmission of a motor vehicle during a change of the gear position. In the case of downshifts in the coasting operation, the hydraulic pressure in the transmission is preferably increased with the initiating of the shifting by way of the pressure control valve in a time-limited manner. Starting from a presettable or preset basic value, the amount of this filling pulse is automatically and in steps for each control operation in the course of the operation of the transmission adapted to a target value in such a manner that an input rotational speed of the transmission or a rotational speed of a driving engine connected in front of the transmission follows a predetermined sequence of movements.

13 Claims, 3 Drawing Sheets

PROCESS FOR CONTROLLING THE ACTUATING PRESSURE IN A CONTROL ELEMENT OF AN ELECTROHYDRAULICALLY CONTROLLED MOTOR VEHICLE TRANSMISSION

BACKGROUND AND SUMMARY OF THE INVENTION

The present invention relates to electrohydraulically controlled motor vehicle transmissions, in which a change of the gear position takes place by controlling certain control elements, such as clutches and brakes. For this purpose, the hydraulically actuated control elements establish the frictional connection between certain sets of gearwheels and a driving engine of the motor vehicle or the housing of the transmission.

A transmission of this type is described in *Bosch Technische Berichte* 7 (1983) 4, Pages 160 to 166 and in *ATZ Automobiltechnische Zeitschrift* 85 (1983) 6, Pages 401 to 405. By way of electromagnetic shift valves, the control elements are alternately connected with a pressure-controlled hydraulic circuit or with a pressure sink. As a function of operating parameters, the control apparatus also controls an electromagnetically actuated pressure control valve by means of which a pressure medium can be fed from a pressure source into the hydraulic circuit. A certain pressure, which is dependent on operating parameters, is adjusted in the hydraulic circuit by means of the pressure control valve.

According to principle, the shift valve, the pipes guiding the pressure medium downstream of the valve, and the control element proper have a variable filling volume which is not negligible. This filling volume has a fabrication variance and may be caused by aging, and vary as a function of operating parameters. Likewise, a variable actuating volume of the pressure medium, which is required for carrying out a necessary control movement, is to be fed to the control element. This actuating volume may have a fabrication variance and be caused by aging, and vary as a function of operating parameters.

The overall control of a control element is therefore composed of the phases "fill control element" and "actuate control element". The time required for changing the gear position is therefore the result of the addition of the time periods required for the two phases. However, low pressures in the hydraulic circuit, as they exist particularly in the case of downshifts in the coasting operation, may not provide a sufficiently fast filling of the participating hydraulic systems. This leads to the requirement of long time periods for a changing of the gear positions.

When the gear position is changed, a control element (of the gear position that is to be taken out) that is to be shut off empties relatively rapidly so that the power transmission is interrupted almost immediately. Since a significant power flux can not yet exist in the control element to be actuated because of the extended filling time, the power flux between the driving engine and the transmission output as a whole can therefore be interrupted. Therefore, the rotational speed of the driving engine may fall to the rotational idling speed during the filling time of the control element.

Although the filling time could be shortened by a further increase of the pressure adjusted during the change of gear positions, this would result in significantly reduced shifting comfort because the clutches and brakes will then close very rapidly. This is exhibited by a more or less strong jolt in the transmission line and affects the longitudinal dynamics of the overall vehicle.

An object of the present invention is to provide a process for the control of the actuating pressure in a control element of an electrohydraulically controlled motor vehicle transmission in which the control elements to be controlled are uniformly filled substantially independently of the operating condition of the motor vehicle without any significant reduction of the power flux between the driving engine and the transmission output.

This and other objects are achieved by the present invention which provides a process for controlling actuating pressure in a control element of an electrohydraulically controlled transmission of a motor vehicle during a change of gear position. The automatic transmission has at least one electromagnetically actuated pressure control valve which is controlled by a control unit as a function of operating parameters and by means of which a pressure medium from a pressure source can be fed into a hydraulic circuit. A certain pressure can be controlled into the hydraulic circuit which is a function of operating parameters and which, during the change of the gear position, is increased by a certain amount. A shift valve is controlled by the control unit and connects the control element alternately with the pressure-controlled hydraulic circuit or with a pressure sink. The process comprises setting a pressure during the change of the gear position and controlling the control element with the pressure control valve in a time-limited manner out of a pressureless condition caused by the shift valve. This includes adjusting an increased pressure in the hydraulic circuit which has been increased with respect to the pressure set during the change of the gear position. Starting from a presettable basic value of the pressure, in the course of the operation of the transmission, the increased pressure is automatically and in steps for each control operation adapted to a target value in such a manner that an input rotational speed of the transmission or a rotational speed of a driving engine connected in front of the transmission follows a preset sequence.

An advantage of the present invention is that it provides a process for controlling the actuating pressure in control elements of an electrohydraulically controlled motor vehicle transmission in which the control elements of the transmission, such as clutches and brakes, in the case of a control, are uniformly filled virtually independently of the operating condition of the motor vehicle. Thus, the power flux between the driving engine and the transmission output is not significantly interrupted. An excessive dropping of the rotational engine speed during the change of the gear position is therefore avoided, particularly in the case of downshifts in the coasting operation.

It is a further advantage that the control element actuates a clutch or a brake of a multi-gear transmission system with planetary trains, and the control element engages at least one gear position of the transmission system, the control element adjusting the pressure in the hydraulic circuit to a variable value which is a function of operating conditions of the motor vehicle and at least of the torque to be transmitted by the transmission system, wherein the increased pressure is a function of the gear positions to be changed and of the direction of the change of gear positions. The rotational speed range of the internal-combustion engine is divided into ranges and a certain pressure level corresponds to the increased pressure for each range.

Other objects, advantages and novel features of the present invention will become apparent from the following detailed description of the invention when considered in conjunction with the accompanying drawings.

DETAILED DESCRIPTION OF THE DRAWINGS

Figure 1:
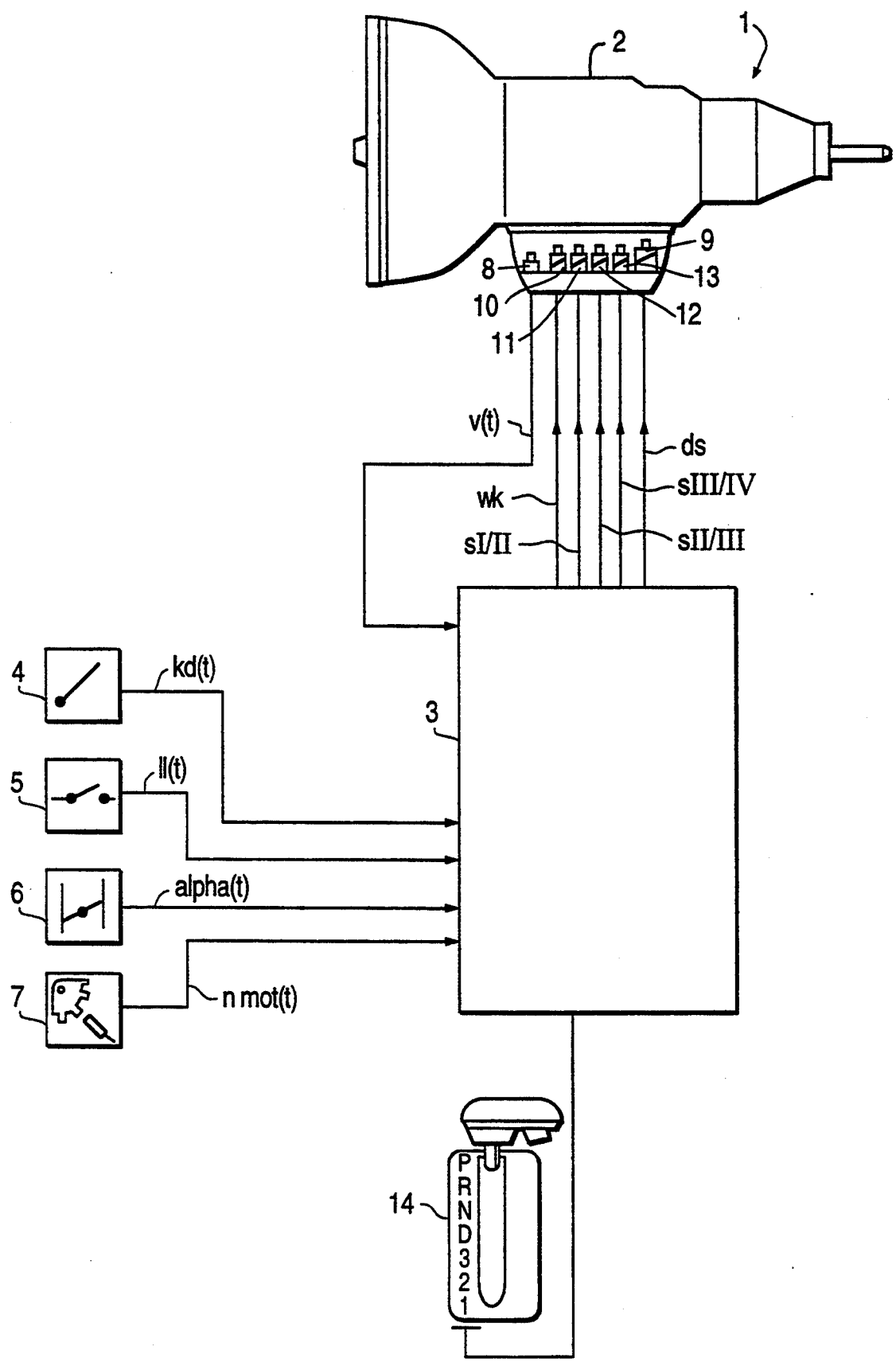
FIG. 1 is a block diagram of an electrohydraulic control system of an automatically shifting transmission of a motor vehicle used with the method of the present invention.

In FIG. 1, reference number 1 indicates an electrohydraulic control system of an automatically shifting motor vehicle transmission 2, as described, for example, in Bosch Technishe Berichte, 7 (1983) 4, Pages 160 to 166 and in ATZ 85 (1983) 6, Pages 401 to 405.

In the following description, signals or values which change with the time t are illustrated as functions of the time f(t). As a function of: a kick-down signal (kd (t)) of a kick-down generator 4 on the accelerator pedal 1 of the motor vehicle; an idling signal 11(t) of a throttle switch 5; a throttle position alpha (t) of a throttle angle generator 6 (or a respective equivalent position generator for the position of an element influencing the power of the driving engine of the motor vehicle, such as an accelerator pedal or an injection pump lever of a self-igniting diesel internal-combustion engine); a rotational engine speed nmot(t) of a rotational engine speed generator 7 of an internal-combustion engine which is not shown; and a driving speed v(t) (transmission output rotational speed) of a transmission output rotational speed generator 8, a control unit 3 controls a number of values. For example, the control unit 3 controls: a pressure control valve 9 for the pressure of a hydraulic fluid (signal output ds); a first shift valve 10 for the control of a converter or a converter lockup clutch (signal output wk); a second shift valve 11 for the control of a gear position change between gear positions I and II (signal output sI/II); a third shift valve 12 for the control of the gear position change between gear positions II and III (signal output sII/III); and a fourth shift valve 13 for the control of the gear position change between gear positions III/IV (signal output sIII/Iv).

The shift valves 10 to 13 connect control elements or shift elements of the transmission 2, such as brakes or clutches, alternately with the pressure-carrying hydraulic circuit or a pressure sink (sump).

Figure 2:
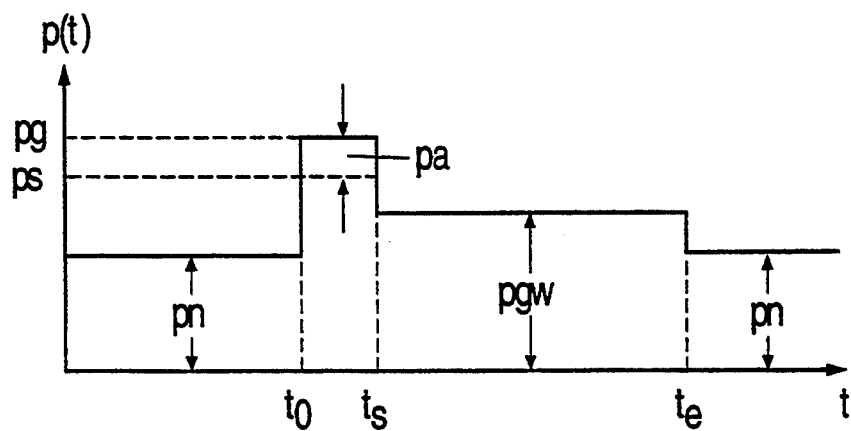
FIG. 2 is a pressure-time diagram according to which the pressure is controlled in accordance with an embodiment of the method of the present invention in a hydraulic circuit of an electrohydraulically controlled transmission when the gear position is changed.

In a diagram illustrated in FIG. 2, a pressure p(t) in a hydraulic circuit of an electrohydraulically controlled multi-gear transmission 2 is plotted with respect to time (t). In these transmissions, by way of the electromagnetically actuated pressure control valve 9, a pressure medium is fed from a pressure source into a hydraulic circuit.

For the setting of a certain pressure that is dependent on operating parameters, the pressure control valve 9 is controlled by the electronic control unit 3 which, as described above, detects or simulates these operating parameters. In this case, the pressure control valve 9 may be constructed as a proportional valve or as a proportionally acting timed valve or as a correspondingly acting pressure control arrangement.

During normal operation of the transmission 2 when a gear position is engaged, the pressure in the hydraulic circuit is controlled to a normal pressure pn which is a function of the operating parameters. The level of the normal pressure pn is set in such a manner that the control element or elements, which is (are) operative for a momentarily engaged gear position for driving the wheels securely without any slip, transmit(s) the drive torque of a driving engine connected in front of the transmission.

When the gear position is changed, certain control elements (corresponding to the gear position to be taken out) are separated from the hydraulic circuit by the shift valves 11-13 and are connected with the pressure sink while other control elements are connected with the hydraulic circuit by the controlled shift valves 11-13.

In order to ensure the required actuating pressure and for reaching a certain shifting comfort, a slightly increased pressure pgw is adjusted by the pressure control valve 9 during the changing of the gear position so that the control elements can cover their corresponding actuating path within a certain time period (from the point in time $t_0$ at the start, to the point in time $t_e$ at the end of the gear change).

Generally, the shift valves 11-13, the pipes guiding the pressure medium downstream of the valve, and the control element proper have a filling volume which is not negligible and which, as a rule, has a fabrication variance and may be caused by aging and varies as a function of operating parameters. In addition, in order to carry out a required control movement, a certain actuating volume must be fed to the control element which may also have a fabrication variance and is a function of operating parameters and also changes because of wear and aging in the course of the operation of the motor vehicle.

Under certain operating conditions of the vehicle, such as downshifts (increase of the transmission ratio) in the coasting operation of the motor vehicle, the control unit 3, as a result of the no-load condition, now sets the normal pressure pn or the slightly increased pressure pgw relatively low. The control elements of the gear position to be taken out become pressureless relatively fast. However, the pressure in the control elements, during the controlling out of the pressureless condition, because of the not negligible filling volume or actuating volume and the lower pressure in the hydraulic circuit, builds up only relatively slowly so that, according to FIG. 3, there is a fall in the rotational engine speed after the start of the gear position change at $t_0$. It is only starting from the point in time $t_s$, when the control elements are filled, that a rise of the rotational engine speed (nmot(t)) occurs again.

Figure 3:
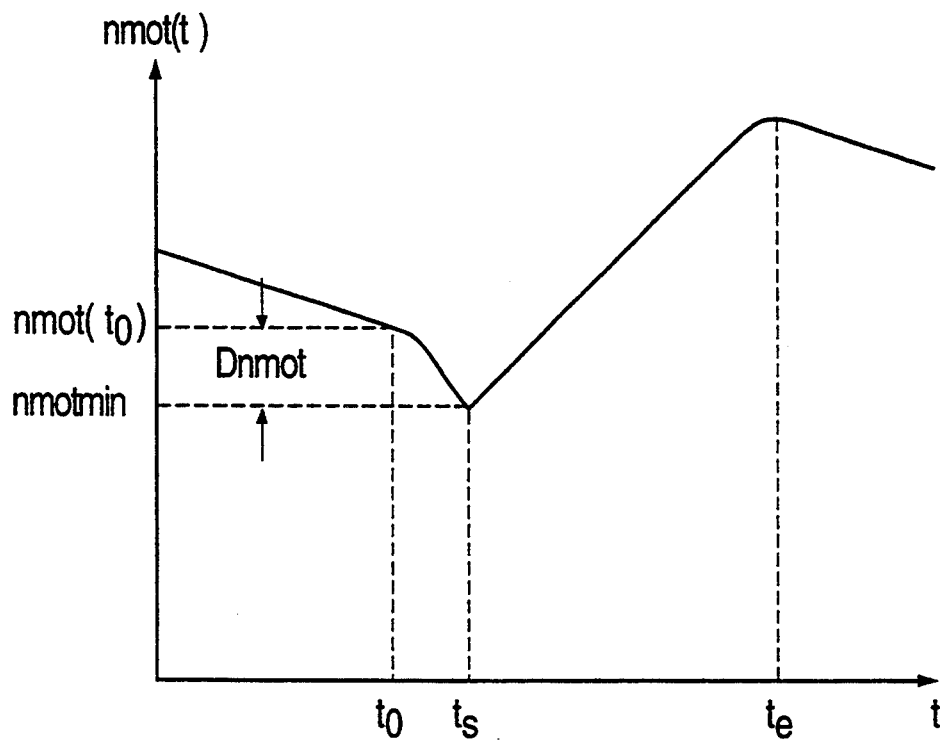
FIG. 3 is a rotational speed - time diagram for a rotational speed of a driving engine connected in front of the transmission.

The present invention limits the falling of the rotational speed (rotational engine speed nmot) of the driving engine connected in front of the transmission 2 in the case of such a change of the gear position, according to FIG. 2, between points in time $t_0$ and $t_s$. It does this by controlling the control element out of the pressureless condition by means of the shift valve 11-13, an increased pressure (filling pulse pg) being adjusted in the hydraulic circuit by the pressure control valve 9 in a time-limited manner, as indicated in FIG. 2. In the course of the operation of the transmission, starting from a presettable or preset basic value ps, the increased pressure is automatically, and in steps for each control operation, adapted (pressure adaptation pa) to a target value (pg=ps+pa) in such a manner that an input rotational speed of the transmission or the rotational engine speed follows a preset sequence of movements or reacts with a preset course of movements, as illustrated in FIG. 3.

The level of the pressure adaptation pa of the basic value ps is limited in this case by a calculated value which is obtained when all systems are at the system limits resulting in the worst case (transmission parts at the tolerance limit; control elements almost worn out).

As a rule, the setting of the increased pressure (filling pulse pg) is necessary only in the case of downshifts in the coasting operation, that is, in the no-load condition. However, the level of pressure of the filling pulse pg is preferably a function of the rotational speed. In this case, the rotational speed range of the internal-combustion engine, for the purpose of a simplification of the control, is divided into ranges, and a certain pressure level is assigned to the filling pulse pg for each range.

In addition, a differentiating of the pressure level of the filling pulse can also be carried out according to the gear positions to be changed because, as a rule, there is a difference between the filling and actuating volumes of the individual gear positions to be engaged. Likewise, the filling pulse pg to be emitted can be stored separately according to the basic value ps and the pressure adaptation pa, so that the basic values only have to be set once during the programming of the control unit and only the values of the pressure adaptation pa must be continuously adapted or replaced during the operation of the motor vehicle. The values for the basic value ps and the pressure adaptation pa are stored in the control unit preferably in the form of tables.

Figure 4:
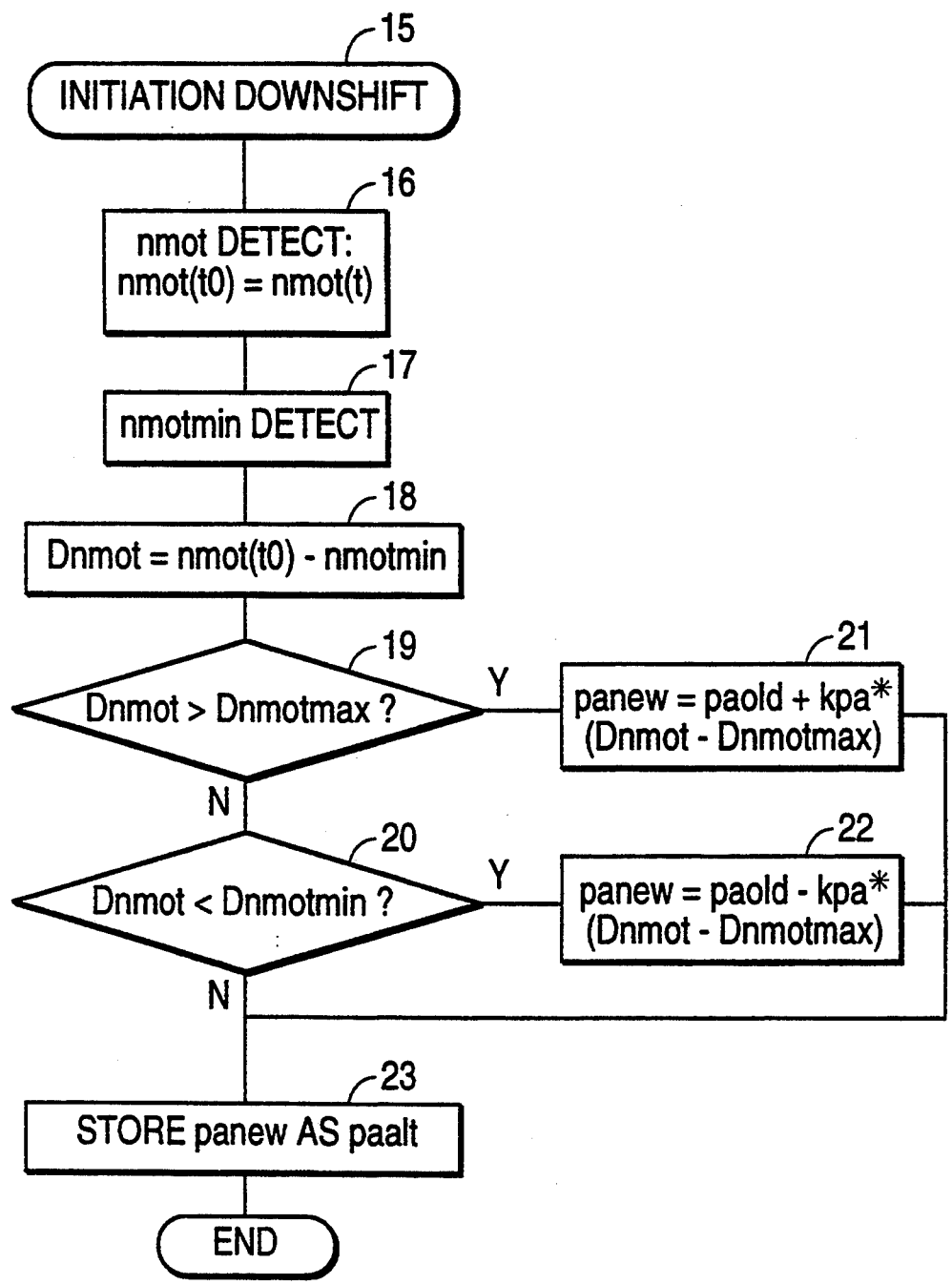
FIG. 4 is a flow chart for determining a pressure adaptation in accordance with an embodiment of the present invention.

In FIG. 4, the determination of the pressure adaptation pa is illustrated in a flow chart. For determining the proportion of the pressure adaptation pa to be added to the basic value ps of the filling pulse, the value nmot(t₀) of the rotational engine speed nmot(t) during the initiating of the downshift 15 at the point in time t=t₀ according to FIG. 3 is now first detected 16 and stored intermediately. The minimum of the rotational engine speed nmotmin which occurs during the gear change is then detected 17, and the difference (fallen rotational speed Dnmot) is determined 18 from the two detected values (Dnmot=nmot(t₀)−nmotmin). Subsequently, the fallen rotational speed Dnmot is compared with a value of a permissible maximal fallen rotational speed Dnmotmax 19 and a value of a permissible minimal fallen rotational speed Dnmotmin 20.

Here, a differentiation is made between three cases. In the first case, the fallen rotational speed Dnmot is larger than the value of the permissible maximal fallen rotational speed (Dnmot>Dnmotmax) 19. By adding a value, which is proportional to a difference Dnmot-Dnmotmax between the fallen rotational speed Dnmot and the value of the maximally permissible fallen rotational speed Dnmotmax, to the value of the pressure adaptation pa$_{old}$ determined during the last corresponding change of the gear position, the pressure adaptation pa:=pa$_{new}$=pa$_{old}$+kpa* (Dnmot-Dnmotmax) is newly determined 21 and stored 23.

In the second case, the fallen rotational speed Dnmot is smaller than the value of the permissible minimal fallen rotational speed Dnmotmin (Dnmot<Dnmotmin) 20. A value is subtracted from the value of the pressure adaptation pa$_{old}$ determined during the last corresponding change of the gear position which is proportional to a difference Dnmot-Dnmotmax between the fallen rotational speed Dnmot and the value of the maximally permissible fallen rotational speed Dnmotmax: pa:=pa$_{new}$=pa$_{old}$+kpa*(Dnmot-Dnmotmax) 22 and is then stored 23.

In the third case, the fallen rotational speed Dnmot is between the minimal fallen rotational speed Dnmotmin and the maximal fallen rotational speed Dnmotmax. The value of the pressure adaptation pa$_{old}$ determined during the last corresponding change of the gear position is maintained: pa:=pa$_{new}$=pa$_{old}$=paalt 23.

In this case, the control can usually be influenced by the vehicle drive by way of a selector lever 14 for the preselection of the gear positions P, R, N, D, 3, 2, 1. As a result, the following gear positions can be used: Gear position P (parking position); R (reverse gear position); N (idling position); D (automatic shifting of all four gear positions IV, III, II, I); 3 (automatic shifting of the three lower gear positions III, II, I); 2 (automatic shifting of gear positions II and I); and 1 (fixing of the first gear position I).

In the illustrated embodiment, the factor kpa is a proportional factor. The time limit of the filling pulse pg is the result of the time difference between the points in time t₀and t$_s$, that is, from the start of the shifting to the reaching of the minimal fallen rotational speed nmotmin. The desired predetermined sequence of movements of the driving engine is finally obtained by the thus indicated adaptation of the filling pulse pg.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A process for controlling actuating pressure in a control element of an electrohydraulically controlled automatic transmission system of a motor vehicle during a change of gear position, the automatic transmission system having at least one electromagnetically actuated pressure control valve which is controlled by a control unit as a function of operating parameters and by means of which a pressure medium from a pressure source can be fed into a hydraulic circuit and a certain pressure can be controlled via control operations into the hydraulic circuit which is a function of operating parameters and which, during the change of gear position, is increased by a certain amount, and having a shift valve which is controlled by the control unit and which connects the control element alternately with the pressure-controlled hydraulic circuit or with a pressure sink, the process comprising:

setting a pressure during the change of gear position;
controlling the control element with the pressure control valve in a time-limited manner out of a pressureless condition caused by the shift valve, including:
adjusting an increased pressure in the hydraulic circuit which has been increased with respect to the pressure set during the change of gear position, wherein, starting from a presettable basic value of the pressure, in the course of the operation of the transmission system, the increased pressure is automatically and in steps for each of said control operations adapted to a target value such that a rotational speed decrease of an input rotational speed of the transmission system is within preset limits;

wherein the increased pressure is adjusted only from a start of the change of gear position to a point in time at which the rotational speed of the driving engine passes through a minimum rotational speed;

wherein the amount of pressure adaptation of the basic value is limited by a calculated value which is obtained when the transmission system is situated at system wear limits;

wherein the control element actuates a clutch or a brake of a multi-gear transmission system with planetary trains, and the control element engages at least one gear position of the transmission system, the control element adjusting the pressure in the hydraulic circuit to a variable value which is a function of operating conditions of the motor vehicle and at least of the torque to be transmitted by the transmission system, wherein the increased pressure is a function of the gear positions to be changed and of the direction of the change of gear positions; and wherein the increased pressure is set by the control unit only in the event of the downshifts in a coasting operation of the motor vehicle.

2. A process according to claim 1, wherein the increased pressure is a function of the rotational speed of the driving engine.

3. A process according to claim 2, wherein the rotational speed of the internal-combustion engine is divided into ranges and a certain pressure level corresponds to the increased pressure for each range.

4. A process according to claim 3, wherein a pressure adaptation to be added to the basic value of the increased pressure is determined by:

detecting and storing a value of the rotational speed of the driving engine connected in front of the transmission when a downshift is initiated, detecting of the minimum of the rotational engine speed occurring during the gear change, determining a difference between the two detected values, and comparing a fallen rotational speed with a value of a permissible minimal fallen rotational speed and with a value of a permissible maximal fallen rotational speed; and adding a value that is proportional to a difference between the fallen rotational speed and the value of the maximally permissible fallen rotational speed to the value of the pressure adaptation determined during a last corresponding change of the gear position, if the fallen rotational speed is larger than the value of the permissible maximal fallen rotational speed;

subtracting a value that is proportional to a difference between the fallen rotational speed and the value of the maximally permissible fallen rotational speed from the value of the pressure adaptation determined during a last corresponding change of the gear position, if the fallen rotational speed is lower than the value of the permissible minimal fallen rotational speed;

retaining the value of the pressure adaptation determined during the last corresponding change of the gear position, if the fallen rotational speed is between the minimal fallen rotational speed and the maximal fallen rotational speed.

5. A process for controlling actuating pressure in a control element of an electrohydraulically controlled transmission of a motor vehicle during a change of gear position, the automatic transmission having at least one electromagnetically actuated pressure control valve which is controlled by a control unit as a function of operating parameters and by means of which a pressure medium from a pressure source can be fed into a hydraulic circuit and a certain pressure can be controlled into the hydraulic circuit which is a function of operating parameters and which, during the change of the gear position, is increased by a certain a mount, and having a shift valve which is controlled by the control unit and which connects the control element alternately with the pressure-controlled hydraulic circuit or with a pressure sink, the process comprising:

setting a pressure during the change of the gear position;

controlling the control element with the pressure control valve in a time-limited manner out of a pressureless condition caused by the shift valve, including:

adjusting an increased pressure in the hydraulic circuit which has been increased with respect to the pressure set during the change of the gear position, wherein, starting from a presettable basic value of the pressure, in the course of the operation of the transmission, the increased pressure is automatically and in steps for each control operation adapted to a target value such that an input rotational speed of the transmission is with preset limits from a start of the gear change to a point in time at which the input rotational speed passes through a minimum speed wherein the increased pressure is set by the control unit only in the event of downshifts in a coasting operation of the motor vehicle.

6. A process according to claim 5, wherein the increased pressure is a function of the rotational speed of the driving engine.

7. A process according to claim 5, wherein the rotational speed of the internal-combustion engine is divided into ranges and a certain pressure level corresponds to the increased pressure for each range.

8. A process for controlling actuating pressure in a control element of an electrohydraulically controlled automatic transmission system of a motor vehicle during a change of gear position, the automatic transmission system having at least one electromagnetically actuated pressure control valve which is controlled by a control unit as a function of operating parameters and by means of which a pressure medium from a pressure source can be fed into a hydraulic circuit and a certain pressure can be controlled via control operations into the hydraulic circuit which is a function of operating parameters and which, during the change of gear position, is increased by a certain amount, and having a shift valve which is controlled by the control unit and which connects the control element alternately with the pressure-controlled hydraulic circuit or with a pressure sink, the process comprising:

setting a pressure during the change of gear position;

controlling the control element with the pressure control valve in a time-limited manner out of a pressureless condition caused by the shift valve, including:

adjusting an increased pressure in the hydraulic circuit which has been increased with respect to the pressure set during the change of gear position, wherein, starting from a presettable basic value of the pressure, in the course of the operation of the transmission system, the increased pressure is automatically and in steps for each of said control operations adapted to a target value such that a rotational speed decrease of a rotational speed of a driving engine connected in front of the transmission is within preset limits;

wherein the increased pressure is adjusted only from a start of the change of gear position to a point in time at which the rotational speed of the driving engine passes through a minimum rotational speed;

wherein the amount of pressure adaptation of the basic value is limited by a calculated value which is obtained when the transmission system is situated at system wear limits;

wherein the control element actuates a clutch or a brake of a multi-gear transmission system with planetary trains, and the control element engages at least one gear position of the transmission system, the control element adjusting the pressure in the hydraulic circuit to a variable value which is a function of operating conditions of the motor vehicle and at least of the torque to be transmitted by the transmission system, wherein the increased pressure is a function of the gear positions to be changed and of the direction of the change of gear positions; and wherein the increased pressure is set by the control unit only in the event of the downshifts in a coasting operation of the motor vehicle.

9. A process according to claim 8, wherein the increased pressure is a function of the rotational speed of the driving engine.

10. A process according to claim 8, wherein the rotational speed of the internal-combustion engine is divided into ranges and a certain pressure level corresponds to the increased pressure for each range.

11. A process for controlling actuating pressure in a control element of an electrohydraulically controlled transmission of a motor vehicle during a change of gear position, the automatic transmission having at least one electromagnetically actuated pressure control valve which is controlled by a control unit as a function of operating parameters and by means of which a pressure medium from a pressure source can be fed into a hydraulic circuit and a certain pressure can be controlled into the hydraulic circuit which is a function of operating parameters and which, during the change of the gear position, is increased by a certain amount, and having a shift valve which is controlled by the control unit and which connects the control element alternately with the pressure-controlled hydraulic circuit or with a pressure sink, the process comprising:

setting a pressure during the change of the gear position;

controlling the control element with the pressure control valve in time-limited manner out of a pressureless condition caused by the shift valve, including:

adjusting an increased pressure in the hydraulic circuit which has been increased with respect to the pressure set during the change of the gear position, wherein, starting from a presettable basic value of the pressure, in the course of the operation of the transmission, the increased pressure is automatically and in steps for each control operation adapted to a target value such that a rotational speed of a driving engine connected in front of the transmission is within preset wherein the increased pressure is set by the control unit only in the event of downshifts in a coasting operation of the motor vehicle.

12. A process according to claim 11, wherein the increased pressure is a function of the rotational speed of the driving engine.

13. A process according to claim 11, wherein the rotational speed of the internal-combustion engine is divided into ranges and a certain pressure level corresponds to the increased pressure for each range.

* * * * *